United States Patent
Bao-Kun et al.

[11] Patent Number: 6,126,700
[45] Date of Patent: Oct. 3, 2000

[54] BLACK DYE COMPOSITION

[75] Inventors: Lai Bao-Kun; Song Der-Chin, both of Tau-Yuan Hsien, Taiwan

[73] Assignee: Everlight USA, Inc., Pineville, N.C.

[21] Appl. No.: 09/233,455

[22] Filed: Jan. 20, 1999

[51] Int. Cl.[7] .............................. C09B 67/24; C09B 67/22
[52] U.S. Cl. ...................................................... 8/549; 8/641
[58] Field of Search ............................... 8/543–549, 641

[56] References Cited

U.S. PATENT DOCUMENTS

| | | |
|---|---|---|
| 5,445,654 | 8/1995 | Hussong et al. . |
| 5,611,821 | 3/1997 | Huang et al. . |
| 5,690,698 | 11/1997 | Von Der Eltz et al. . |
| 5,779,739 | 7/1998 | Von Der Eltz et al. . |
| 5,931,974 | 8/1999 | Pedemonte . |

FOREIGN PATENT DOCUMENTS

| | | |
|---|---|---|
| 7-278461 | 10/1995 | Japan . |
| 9-169922 | 6/1997 | Japan . |

*Primary Examiner*—Margaret Einsmann
*Attorney, Agent, or Firm*—Bacon & Thomas

[57] ABSTRACT

A black dye composition comprising (a) a black reactive dye of the formula (I):

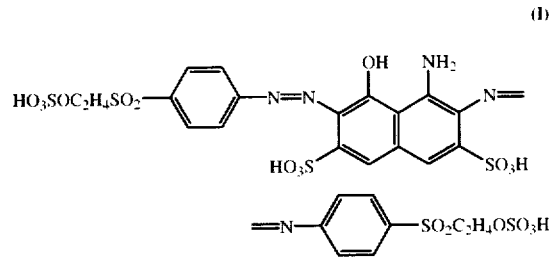

(b) at least a black or blue reactive dye with a good fastness of oxidative bleach and wash fastness; and (c) at least a red, orange or yellow reactive azo dye. The black dye composition of present invention can be widely applied to dyeing a greater range of spinning and weaving products that contain hydroxyl group or amide group.

13 Claims, No Drawings

BLACK DYE COMPOSITION

FIELD OF THE INVENTION

The present invention relates to a black dye composition, in particular relates to a black dye composition suitable for use in dyeing fiber materials.

BACKGROUND OF THE INVENTION

So far, there is no single reactive dye which can produce a high black shade build up property. In order to get a high black shade build up property, a reactive dye composition which contains a plurality of reactive dye components has been used. Usually, one black reactive dye (for example, the following formula (I) black reactive dye) as the major component

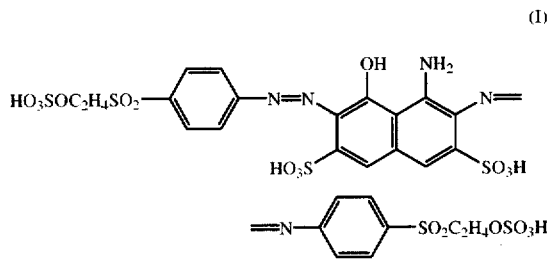

is mixed with red, orange, yellow or other shade reactive dye components to get the black reactive dye composition.

Black reactive dye compositions are already known from Japanese Patent Laid-open No. 58-160362, 63-178170, 1-315469, 2-73870, 2-202956, 8-104822, 8-253697, U.S. Pat. No. 5,445,654 and U.S. Pat. No. 5,611,821.

Due to strict requirements in energy saving and environmental regulations, advanced washing machines and highly efficient detergent have been continuously developed. The use of highly efficient detergent greatly improves the cleanness of washed materials. However, washed materials fade soon after several washings. This problem becomes worse if washed materials were dyed by the reactive black dye composition based on the major component of formula (I) black reactive dye. Therefore, there is a strong demand for a reactive black dye composition having good property in fastness of oxidative bleach and wash fastness.

A reactive black dye composition which is comprised of the above formula (I) black reactive dye as the major component and mixed with a plurality of reactive azo dyes fades soon after several wash. The reason is the poor property of the reactive black dye composition in fastness of oxidative bleach. Therefore, washed materials are caused to fade by the bleaching agent during washing.

If the additional dye components of the dye composition have different fastness of oxidative bleach, the washedmaterial may be caused to fade, and to change its hue as well. The currently commercially available black dye compositions commonly have this drawback. Because the formula (I) black reactive dye used in currently commercially available black dye compositions has poor property in fastness of oxidative bleach, the hue of the washed material will be caused to change after washing several times if the mixed red, orange, yellow, or other shade of reactive dye components have a better fastness of oxidative bleach, causing the washed block material to change to brown, or other hue.

In order to eliminate the aforesaid problem, there is a suggestion to select red, orange, yellow, or other shades of reactive dye components having the property of fastness of oxidative bleach approximately equal to the formula (I) black reactive dye. A black dye composition prepared according to this method may eliminate the change of hue, however it cannot prevent the washed material from being caused to fade by the bleaching agent.

SUMMARY OF THE INVENTION

It is one object of the present invention to provide a black dye composition that is suitable for use in exhausting, printing, or continuous dyeing of fiber materials, to provide good dying property. It is another object of the present invention to provide a black dye composition that has good property in build-up, fastness of oxidative bleach, wash fastness, wash-off, and levelness.

The black dye composition of the present invention is comprised of: (a) a black reactive dye of the formula (I),

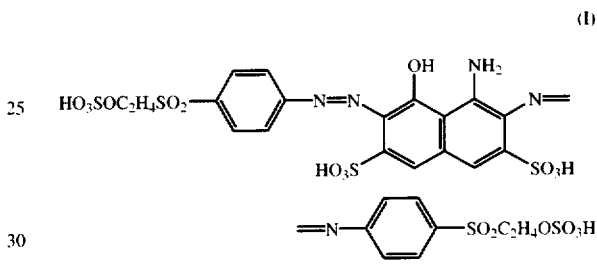

(b) at least a black or blue reactive dye with good fastness of oxidative bleach and wash fastness; and (c) at least a red, orange, yellow or other shade of reactive azo dye.

The black dye composition of the present invention is comprised of the formula (I) black reactive dye as the major component and mixed with a plurality of reactive azo dyes. In order to improve the characteristics of the reactive black dye composition, a black or blue reactive dye of good property in wash fastness and fastness of oxidative bleach is added. This composition effectively eliminates materials from changing in hue, or fading due to the effect of a bleaching agent.

DESCRIPTION OF THE PREFERRED EMBODIMENTS

A black dye composition in accordance with the present invention is generally comprising (a) a black reactive dye of the formula (I), (b) at least a black or blue reactive dye with a good fastness of oxidative bleach and wash fastness, and (c) at least a red, orange, yellow or other shade of reactive azo dye.

There is no special limitation on the black or blue reactive dye of component (b). Any black or blue reactive dye of good property in wash fastness and fastness of oxidative bleach that is compatible to the black reactive dye of formula (I) in dyeing properties, fixation and dying affinity, can be used.

Preferably, the black or blue reactive dye of component (b) is a compound having the following formula (II)

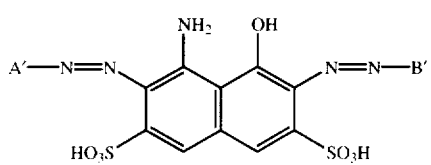
(II)

wherein A' and B' each independent is an aromatic group which is non-substituted or substituted by halogen, $C_1$–$C_4$ alkyl $C_1$–$C_4$ alkoxyl, sulfonyl, or amino groups. The compound of formula (II) and the black reactive dye of formula (I)have similar structure. Both of them are reactive dyes, containing 1-amino-8-hydroxynaphthyl-3,6-disulfonic acid derivative structure.

Examples of formula (II) are:

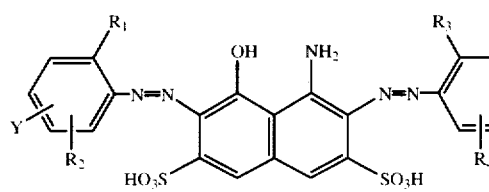
(III)

or

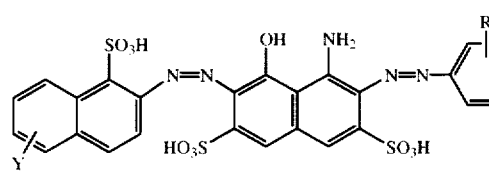
(IV)

wherein Y and Y' each independent is —$SO_2$—, —NH—W,

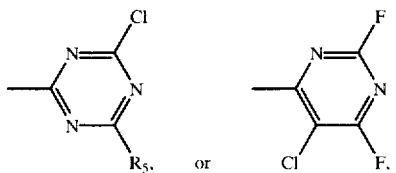

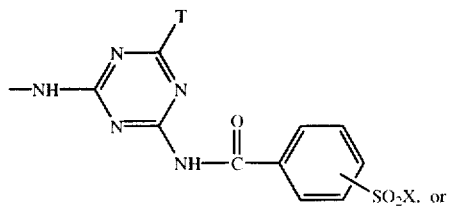

wherein W is $X$ is —OH, —CH=$CH_2$, —$C_2H_4OSO_3H$, or —$C_2H_4Cl$, T is —F or —Cl, P is hydrogen, halogen, $C_1$–$C_4$ alkyl or $C_1$–$C_4$ alkoxyl, $R_5$ is $C_1$–$C_4$ alkoxyl, $R_1$, $R_2$, $R_3$ and $R_4$ each independent is hydrogen, halogen, $C_1$–$C_4$ alkyl $C_1$–$C_4$ alkoxyl, or sulfonyl groups.

More preferably examples of formula (III) and formula (IV) are:

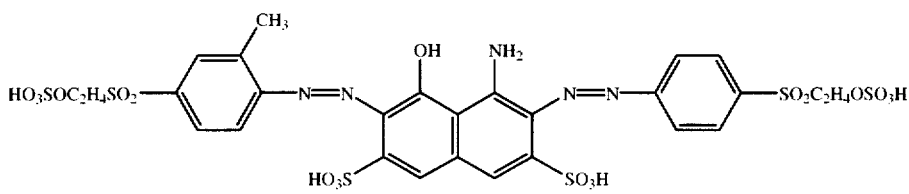
(III-1)

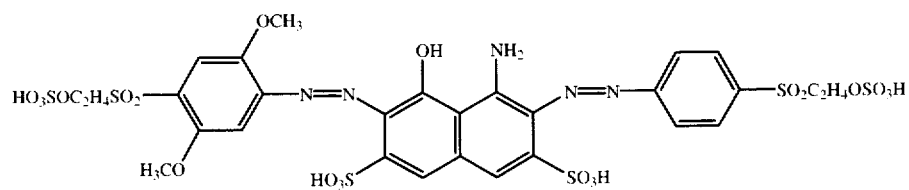
(III-2)
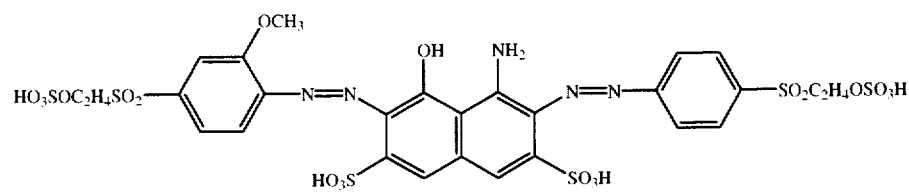
(III-3)
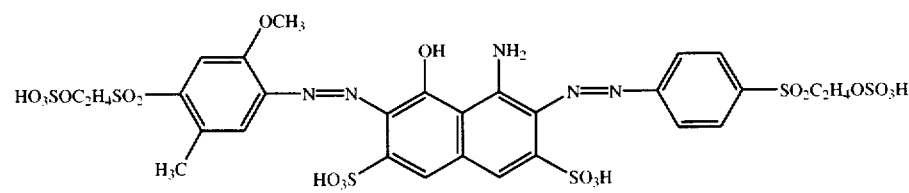
(III-4)
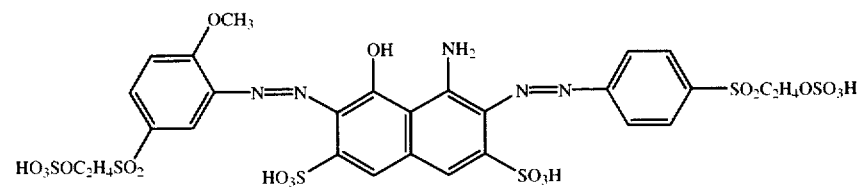
(III-5)
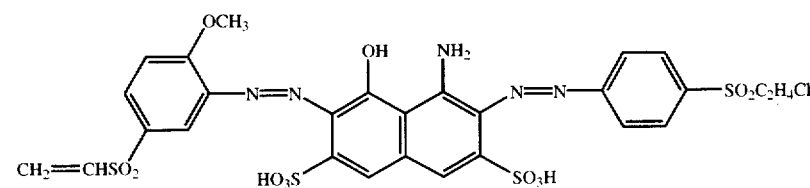
(III-6)
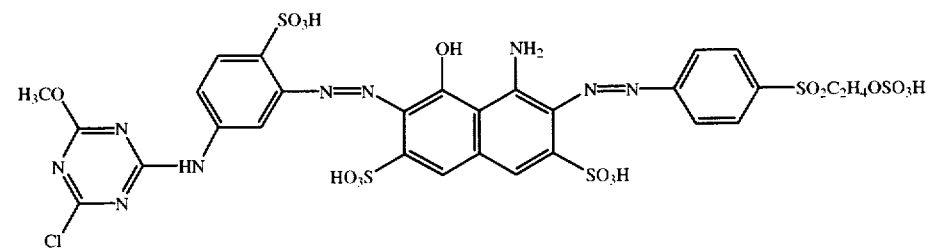
(III-7)
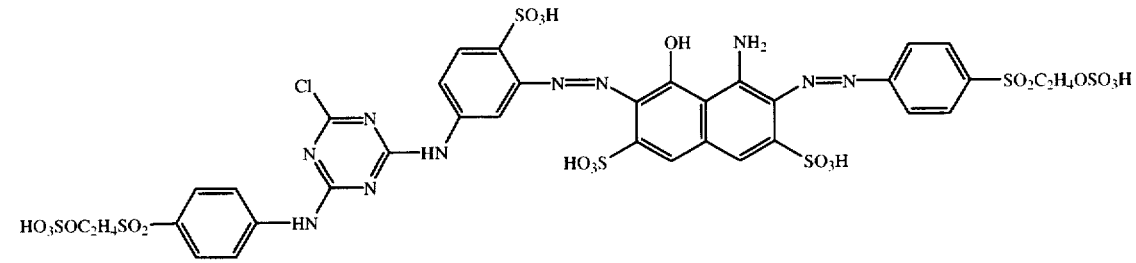
(III-8)

-continued
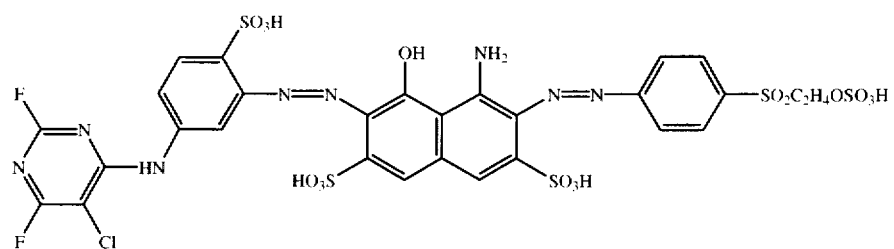
(III-9)
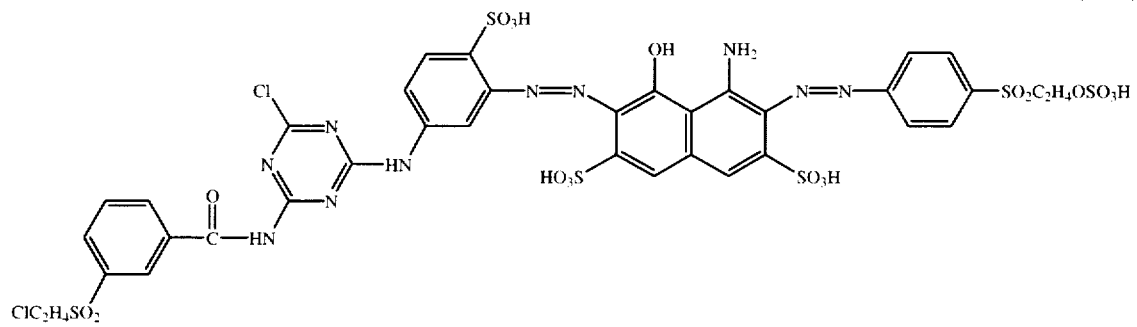
(III-10)
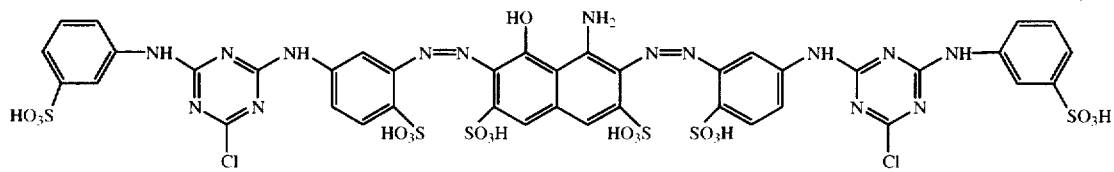
(III-11)
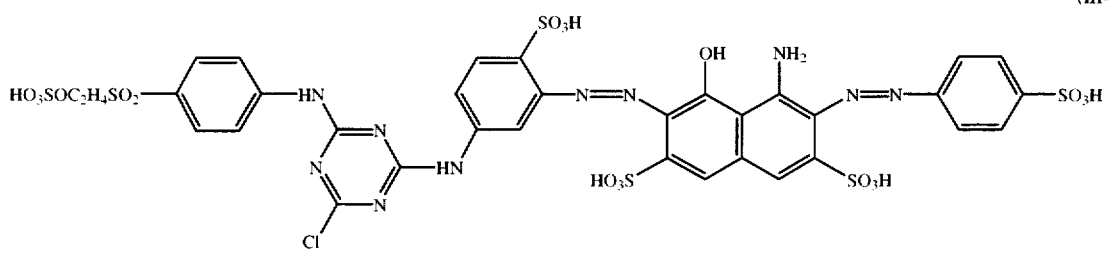
(III-12)
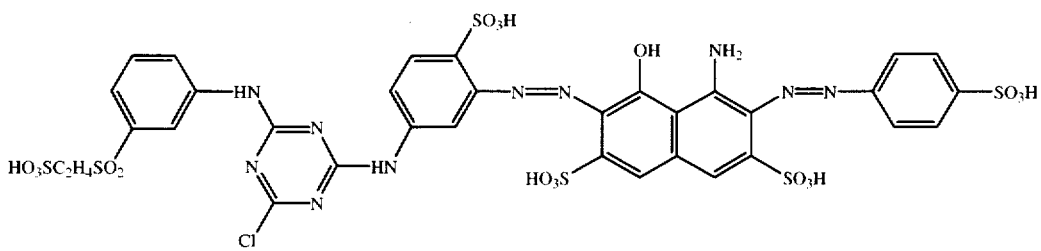
(III-13)
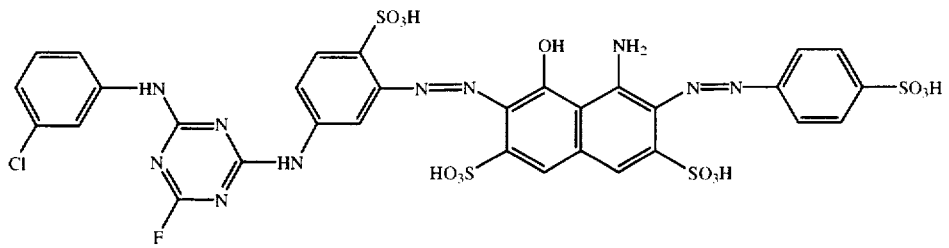
(III-14)

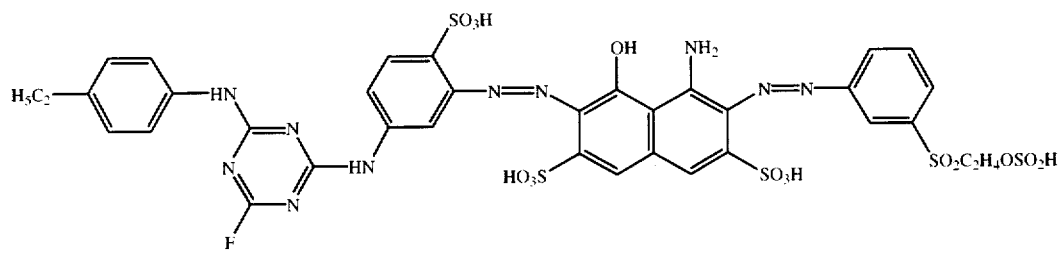
(III-15)
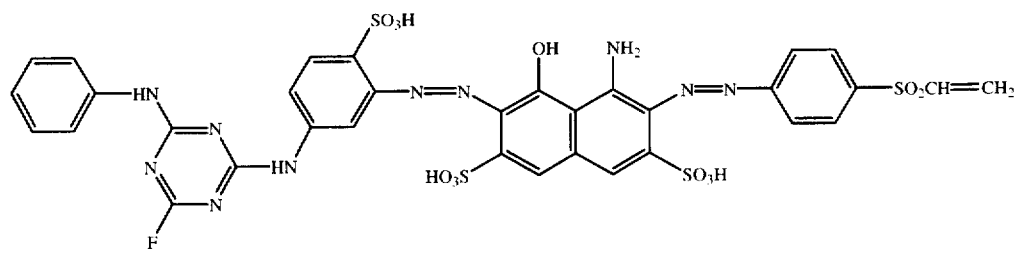
(III-16)
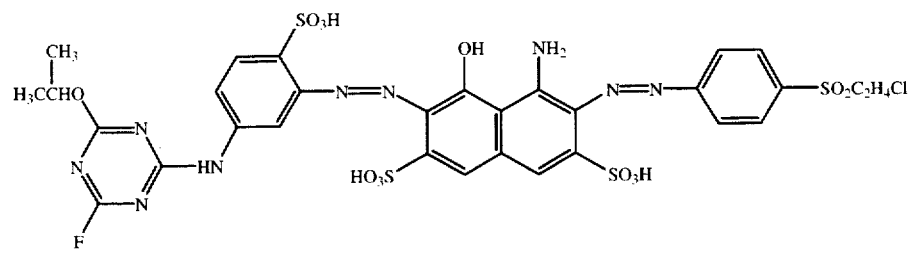
(III-17)
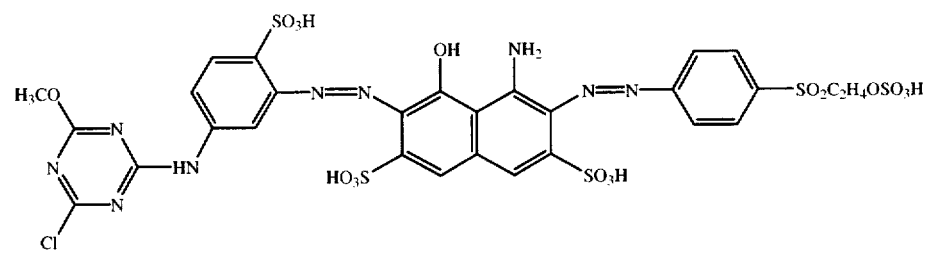
(III-18)
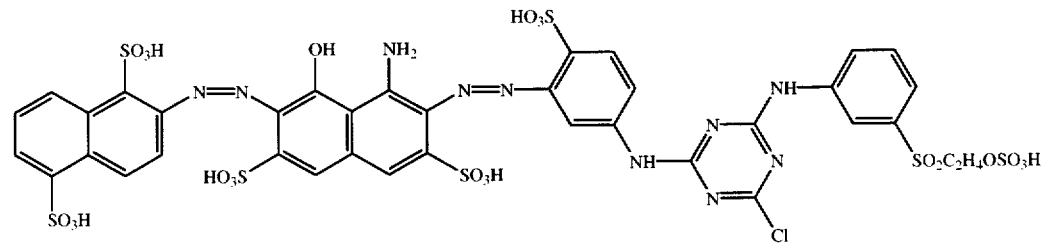
(IV-1)
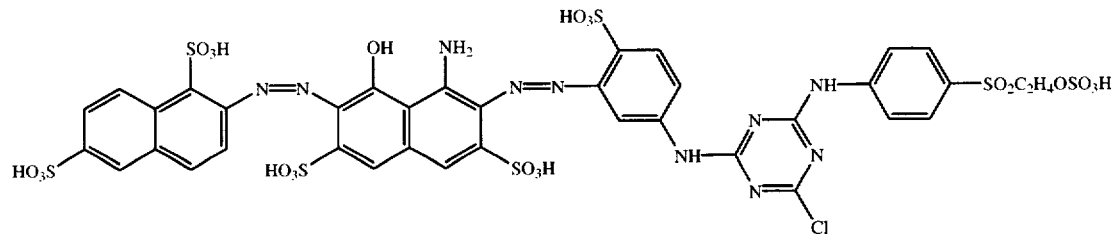
(IV-2)

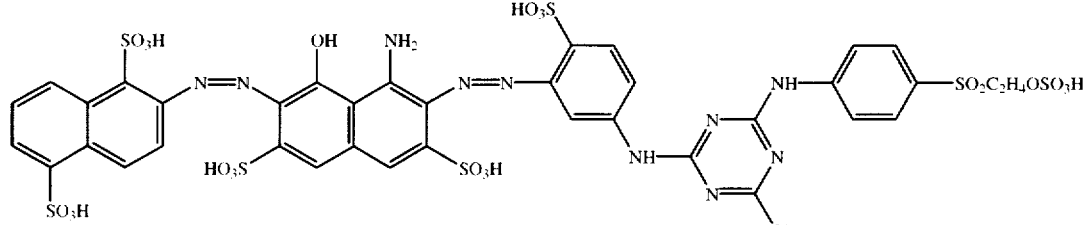

(IV-3)

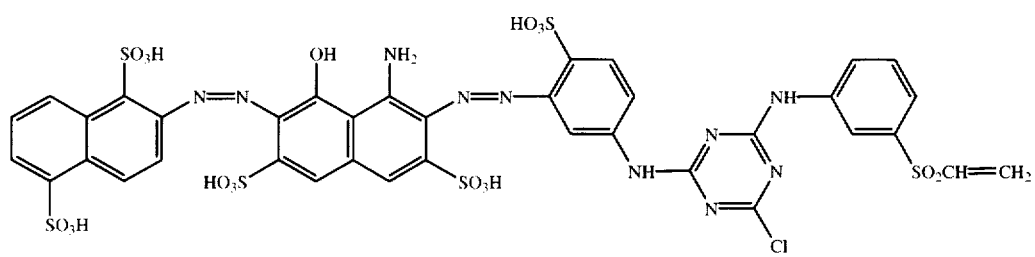

(IV-4)

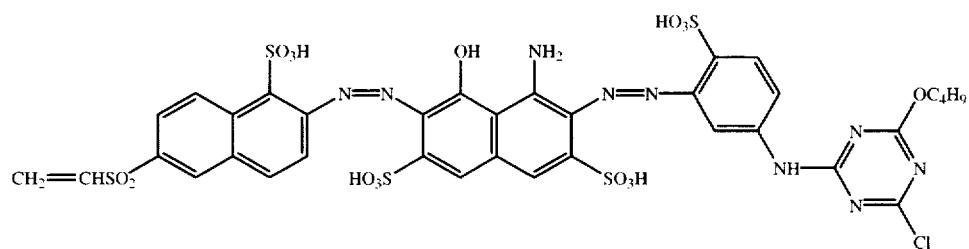

(IV-5)

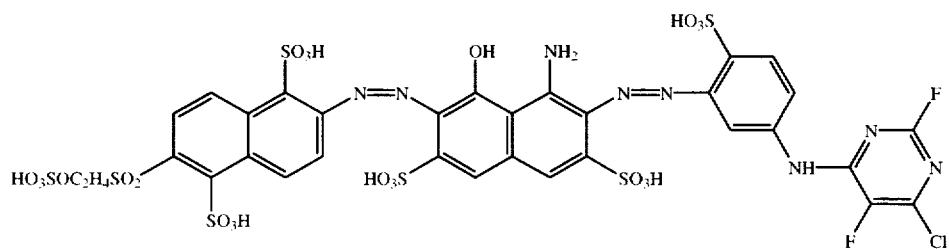

(IV-6)

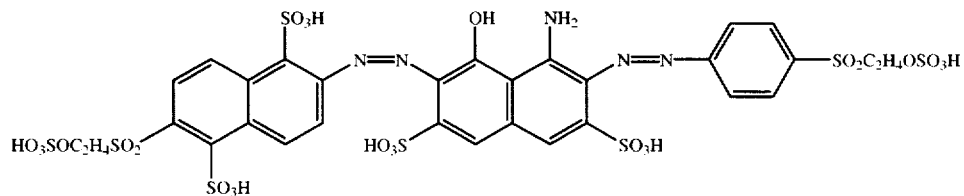

(IV-7)

If the black dye composition is obtained merely by mixing the aforesaid black or blue reactive dye of component (b) with the black reactive dye of formula (I), it does not have the desired property in build-up dyeing. The reactive dye(s) of red, orange, yellow or other shade must be added, so that a black dye composition having good property in build-up dyeing can be obtained.

There is no special limitation on the red, orange, yellow or other shade of reactive azo dye of component (c). Any red, orange, yellow or other shade of reactive azo dye of good property in build-up dyeing that is compatible to the black reactive dye of the formula (I) in dyeing properties, fixation and dying affinity, can be used.

Preferably, the examples of red, orange, yellow or other shade of reactive azo dye of component (c) are:

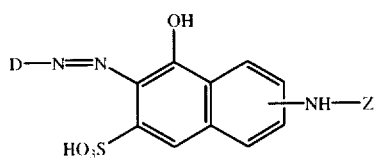
(V)
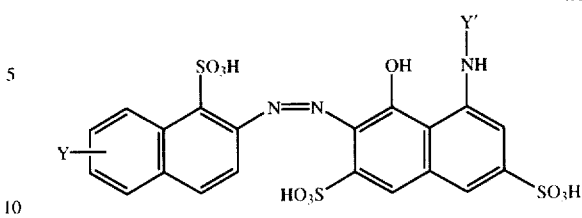
(X)
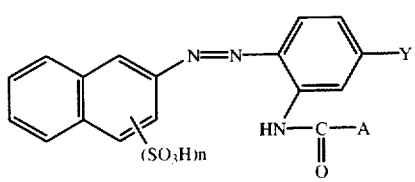
(VI)
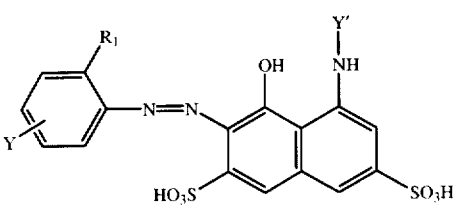
(XI)
wherein D is
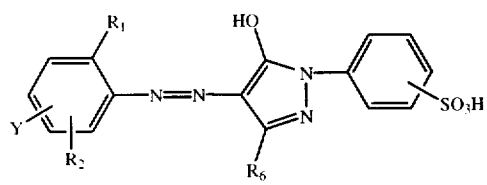
(VII)
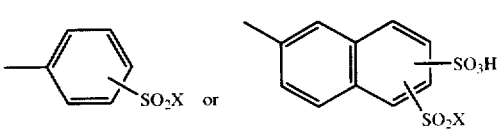
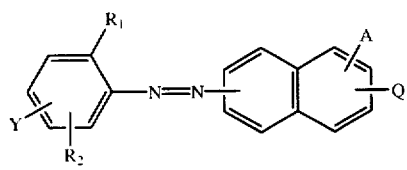
(VIII)
Z is 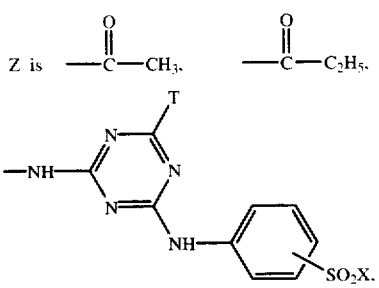
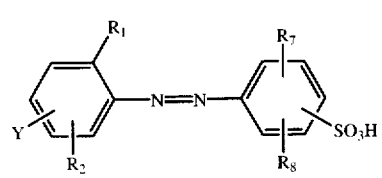
(IX)
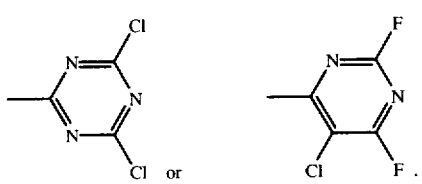
A is —OH, —NH$_2$ or —CH$_3$, R$_6$ is —CO$_2$H, —NH$_2$ or —CH$_3$, Q is —CO$_2$H or —SO$_3$H, R$_7$ and R$_8$ each independent is hydrogen, C$_1$–C$_4$ alkyl, amino or amino derivatives, n is 1, 2, or 3, wherein X, Y, R$_1$, R$_2$ and T are defined as the above. More specific examples of component (c) are:

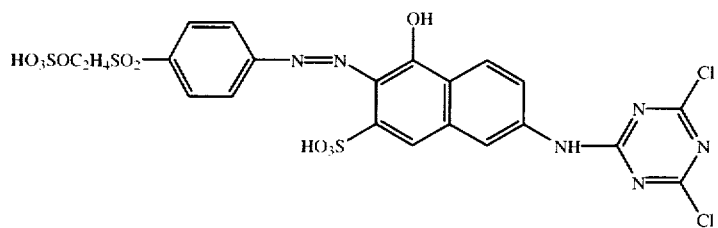
(V-1)
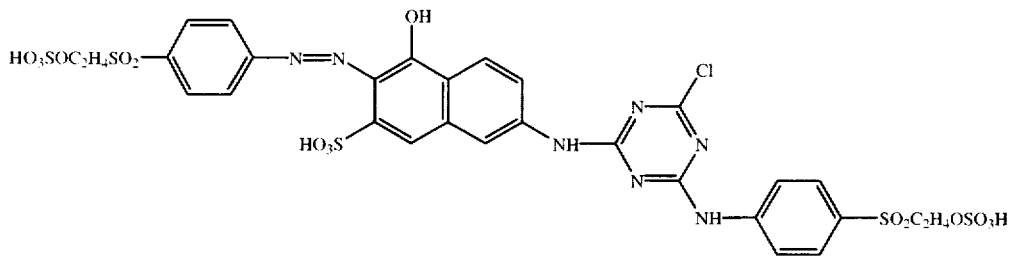
(V-2)
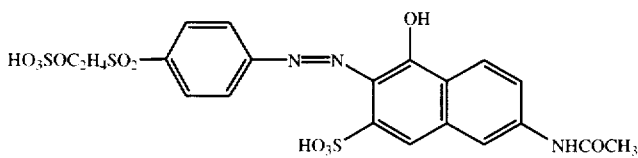
(V-3)
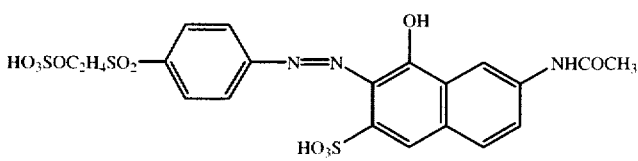
(V-4)
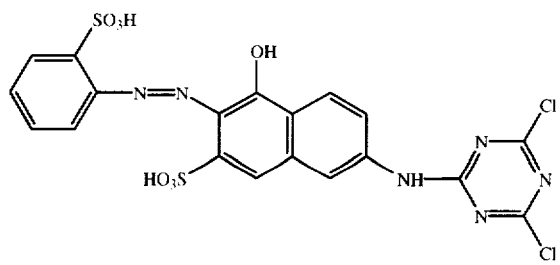
(V-5)
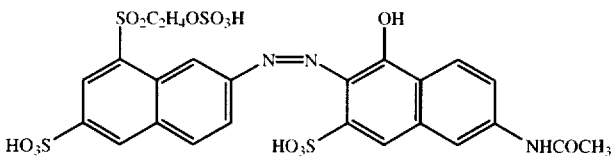
(V-6)
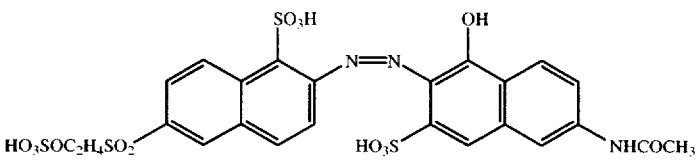
(V-7)

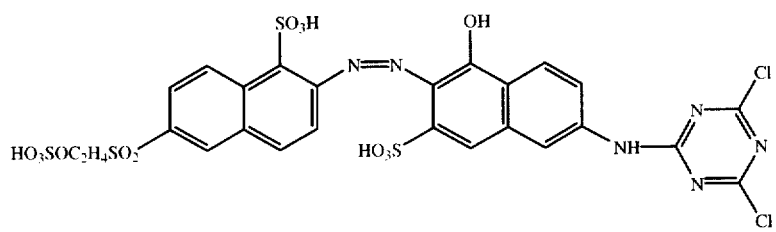
(V-8)
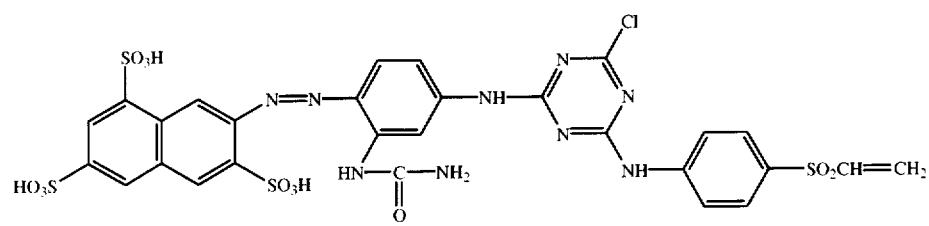
(VI-1)
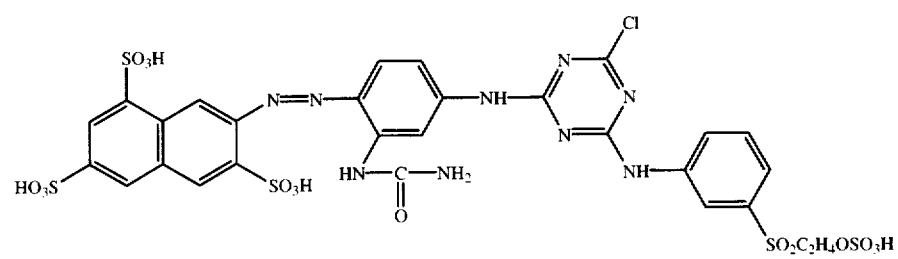
(VI-2)
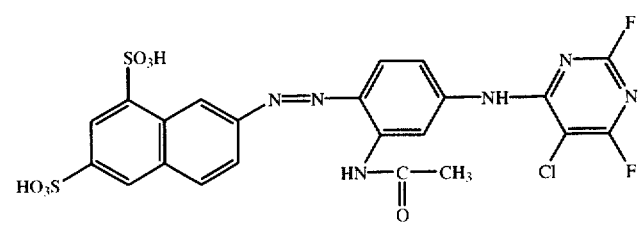
(VI-3)
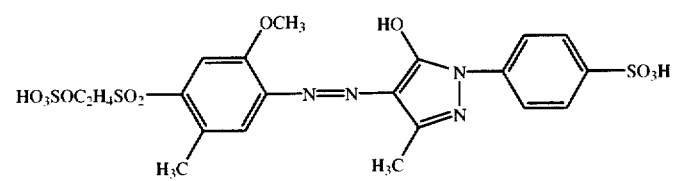
(VII-1)
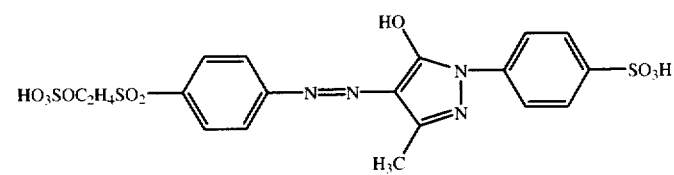
(VII-2)
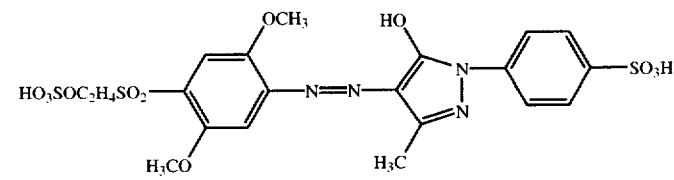
(VII-3)

-continued
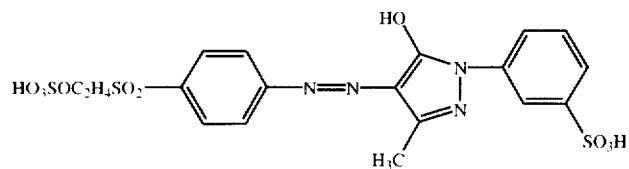
(VII-4)
(VII-5)
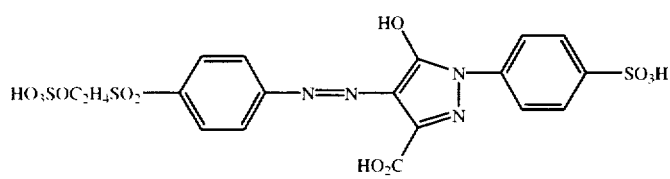
(VII-6)
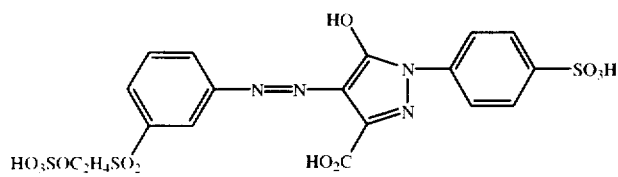
(VII-7)
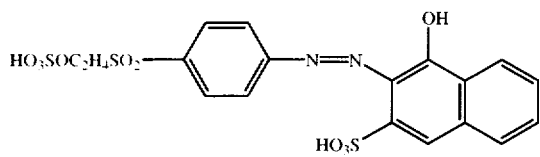
(VIII-1)
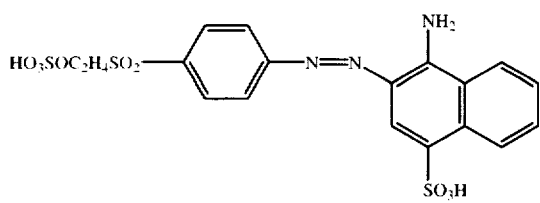
(VIII-2)
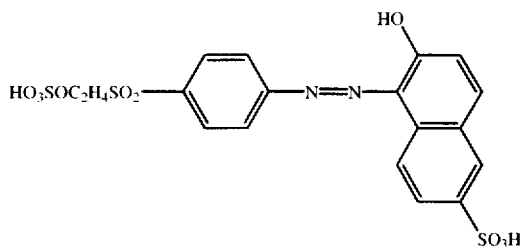
(VIII-3)

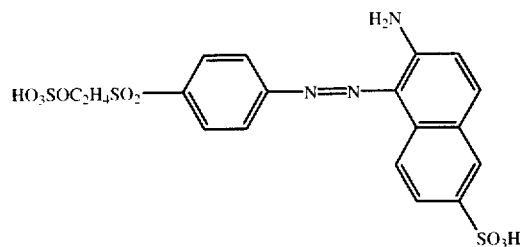
(VIII-4)
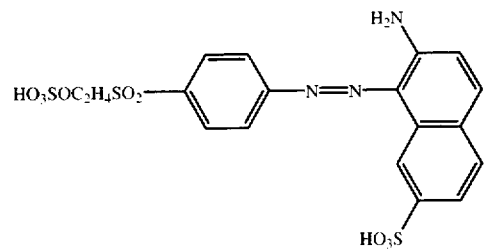
(VIII-5)
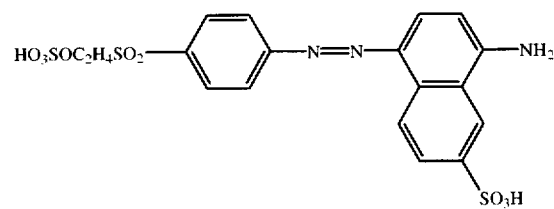
(VIII-6)
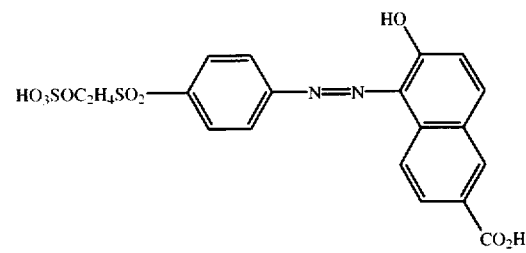
(VIII-7)
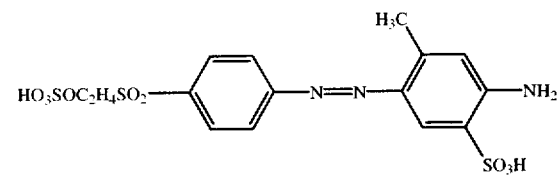
(IX-1)
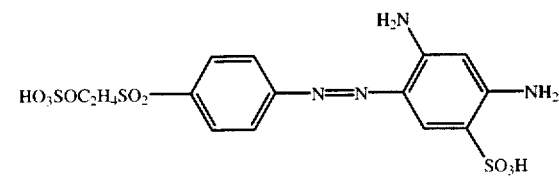
(IX-2)
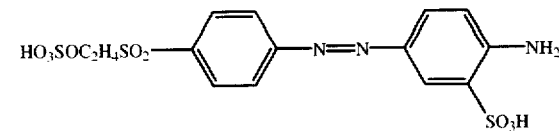
(IX-3)

(IX-4)
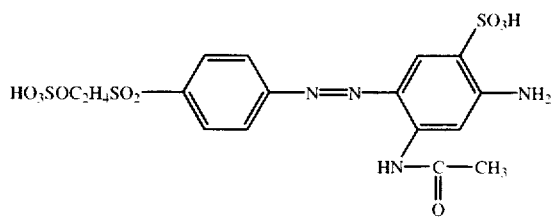
(X-1)
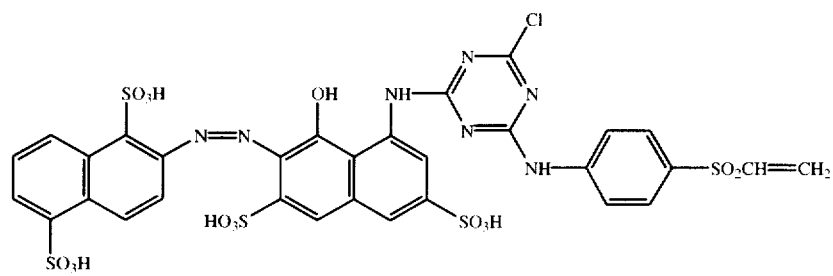
(X-2)
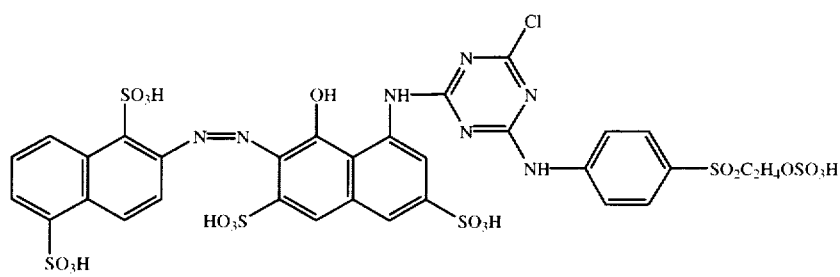
(X-3)
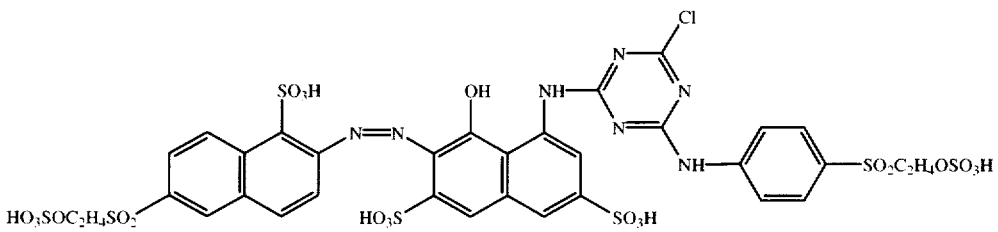
(XI-1)
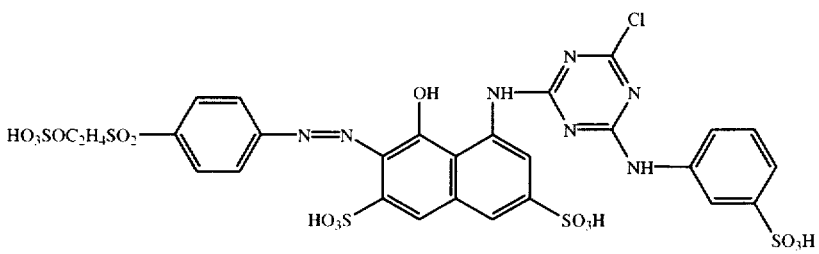
(XI-2)
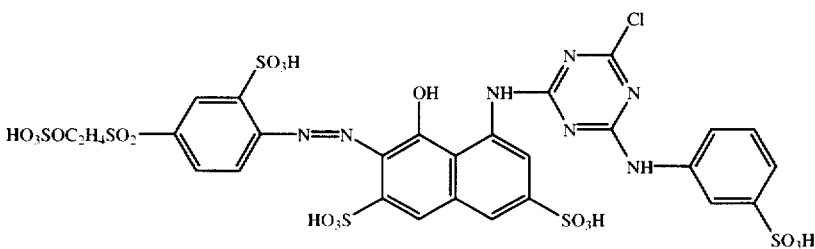

The composition of the present invention can be prepared in many ways. For example, by using separately prepared dye components mixing each dye together, or it can be prepared by mixing one component alone then with another component. The way of mixing is by using proper mixer, for example, as in a ball and sand grinder. In the same way, individual dye with different components can make dyeing liquid through stirring, or through control of conditions in each dye preparation to produce an ideal mixture. In the process of exhausting or printing, separate dyes can mixed together or mixed with other dyes.

The dyestuff of the present invention can be in the form of powder, granular, particle or liquid and an auxiliary reagent, for example, a retarding agent, leveling agent, assistant agent, surfactant agent, or dispersing agent may be added.

The dyestuffs of the present invention all contain an anion group, such as a sulfonyl group. For convenience in the statement, they are expressed as free acid in the specification. When the dyestuff of the present invention is manufactured, purified, or used, it often exist in the form of water soluble salt, especially an alkaline metallic salt, such as sodium salt, potassium salt or ammonium salt.

The ratio of each dye component can be changed in a wide range. In general, the minimum relative weight percentage for each dye component is 3%, and the maximum relative weight percentage is 90%.

The black dye composition of the present invention can be widely applied to dyeing a greater range of spinning and weaving products that contain a hydroxyl group or amide group, etc., such as wool, silk, polyamide and natural or synthetic fiber; and also cellulose fiber like cotton, linen, artificial cotton, and artificial linen, etc. The dyeing method used is the one generally used when applying reactive dyestuff. Take the example of dyeing cellulose fiber. The dyed material will be applied on acid binding solution such as sodium hydroxide, sodium phosphonic, sodium carbonate or sodium bicarbonate before, during and after dyeing, during which a required amount of auxiliary reagent will be used together with the additional parts.

For cellulose fiber, the black dye composition of the present invention is a dye composition of great industrial value. Dyed material with various good dyeing properties can be obtained, especially the properties of build-up, fastness of oxidative bleach, wash fastness, wash-off, and levelness.

DESCRIPTION OF THE PREFERRED EMBODIMENTS

More detailed examples are used to illustrate the present invention, and these examples are used to explain the present invention. The examples below, which are given simply by way of illustration, must not be taken to limit the scope of the invention.

In these examples, the compound is represented by free acid, but its actual form can be metallic salt, or more possibly alkali salt, especially sodium salt. In these examples, parts is counted as weight, temperature is Celsius °C.

EXAMPLE 1

Take formula (I) dye 58 parts, formula (III-1) dye 20 parts, formula (V-3) dye 15 parts and formula (VI-1) dye 7 parts mixed together to get a homogeneous mixture. Then use the following procedure to carry out dye test and fastness of oxidative bleach test.

Dye Testing:

a. Take the above dye composition two parts and completely dissolve in 1000 parts distilled water to get dyeing solution.

b. Then take the dyeing bottle washed with distilled water and put dyeing solution 24 parts into the bottle. Finally add 6.4 parts Glauber's salt into the bottle.

c. Distilled water is added to the bottle to get total 80 parts.

d. Place eight parts prewetting full cotton woven fabric into the dyeing bottle.

e. The top of the bottle is covered with a lid and shaken to get homogeneous dye.

f. Put dyeing bottle into a thermobath at 60° C. and shake for 20 minutes. Then add 320 g/l pure base 7.5 parts to the bottle and keep at the same temperature for 70 minutes. The fabric is taken out and washed with cold water, then put into a big stainless bucket and wash with hot water for 10 minutes. Then put fabric into another big stainless bucket with 2 g/l soaping agent, and wash with boiling water for another 10 minutes.

g. The fabric is taken out, washed with cold water, then dried.

Fastness of Oxidative Bleach Test:

a. Put a dry cloth in an incubator under relative humility 65% and temperature 20° C. for 4 hours, then take 10×5 cm$^2$ of the cloth for test.

b. Prepare a test solution by dissolving 10 g ECE soap that contains no phosphorus, 12 g sodium perborate, and 1.8 g TAED (tetra acetyl ethylenediamine) in 1000 ml distilled water.

c. Take 110 ml of the test solution thus obtained, and put it in a 550 ml steel cylinder. Then put in 50 pieces of steel balls and the test cloth obtained from step 1.

d. Close the steel cylinder, then put the steel cylinder in a wash fastness test machine under test temperature 60° C. for 30 minutes.

e. Remove the cloth from the steel cylinder after the test, then wash the cloth with clean water, and then dry the cloth.

f. Determination of test result: use Macbeth, Color-Eye 3100 to examine the color based on CMC standards. The quality is acceptable when ΔE<2.

EXAMPLE 2 TO EXAMPLE 24

Take compositions of the following table (I-1) example and table (I-2) comparative example to repeat the dye test and the fastness of oxidative bleach test in example 1. The results were shown in table (II-1) and table (II-2)

TABLE (I-1)

|  | Component (a) | Component (b) | Component (c) | |
|---|---|---|---|---|
|  | Compound (%) | Compound (%) | Compound (%) | Compound (%) |
| Example 2 | (I) 29 | (III-1) 61 | (V-1) 7 | (VI-1) 3 |
| Example 3 | (I) 59 | (III-1) 21 | (V-3) 20 | — |
| Example 4 | (I) 28 | (III-1) 62 | (V-3) 10 | — |
| Example 5 | (I) 55 | (III-1) 16 | (VIII-2) 17 | (IX-2) 12 |
| Example 6 | (I) 31 | (III-1) 52 | (VIII-2) 10 | (IX-2) 7 |
| Example 7 | (I) 57 | (III-2) 22 | (V-1) 14 | (VI-1) 7 |
| Example 8 | (I) 27 | (III-2) 63 | (V-1) 7 | (VI-1) 3 |

TABLE (I-1)-continued

| | Component (a) | Component (b) | Component (c) | |
|---|---|---|---|---|
| | Compound (%) | Compound (%) | Compound (%) | Compound (%) |
| Example 9 | (I) 58 | (III-2) 23 | (V-3) 19 | — |
| Example 10 | (I) 27 | (III-2) 64 | (V-3) 9 | — |
| Example 11 | (I) 54 | (III-2) 17 | (VIII-2) 17 | (IX-2) 12 |
| Example 12 | (I) 29 | (III-2) 55 | (VIII-2) 9 | (IX-2) 7 |
| Example 13 | (I) 56 | (IV-1) 23 | (V-1) 14 | (VI-1) 7 |
| Example 14 | (I) 26 | (IV-1) 64 | (V-1) 7 | (VI-1) 3 |
| Example 15 | (I) 57 | (IV-1) 24 | (V-3) 19 | — |
| Example 16 | (I) 26 | (IV-1) 65 | (V-3) 9 | — |
| Example 17 | (I) 54 | (IV-1) 17 | (VIII-2) 17 | (IX-2) 12 |
| Example 18 | (I) 29 | (IV-1) 56 | (VIII-2) 9 | (IX-2) 6 |
| Example 19 | (I) 89 | (III-1) 11 | — | — |
| Example 20 | (I) 42 | (III-1) 58 | — | — |
| Example 21 | (I) 81 | (III-2) 19 | — | — |
| Example 22 | (I) 40 | (III-2) 60 | — | — |
| Example 23 | (I) 80 | (IV-1) 20 | — | — |
| Example 24 | (I) 39 | (IV-1) 61 | — | — |

TABLE (I-2)

| | Component (a) | Component (c) | | |
|---|---|---|---|---|
| | Compound (%) | Compound (%) | Compound (%) | Compound (%) |
| Comparative Example 1 | (I) 100 | — | — | — |
| Comparative Example 2 | (I) 78 | (V-4) 22 | — | — |
| Comparative Example 3 | (I) 37 | (V-4) 63 | — | — |
| Comparative Example 4 | (I) 73 | (V-1) 18 | (VI-1) 9 | — |
| Comparative Example 5 | (I) 55 | (V-4) 24 | (V-1) 14 | (VI-1) 7 |
| Comparative Example 6 | (I) 25 | (V-4) 66 | (V-1) 6 | (VI-1) 3 |
| Comparative Example 7 | (I) 75 | (V-3) 25 | — | — |
| Comparative Example 8 | (I) 56 | (V-4) 25 | (V-3) 19 | — |
| Comparative Example 9 | (I) 25 | (V-4) 67 | (V-3) 8 | — |
| Comparative Example 10 | (I) 65 | (VIII-2) 21 | (IX-2) 14 | — |
| Comparative Example 11 | (I) 53 | (V-4) 18 | (VIII-2) 17 | (IX-2) 12 |
| Comparative Example 12 | (I) 26 | (V-4) 56 | (VIII-2) 12 | (IX-2) 6 |

TABLE (II-1)

| | ΔE | Hue Change Value | Hue Change | Strength (%) |
|---|---|---|---|---|
| Example 1 | 1.57 | 1.20 | (R) | 88.2 |
| Example 2 | 1.04 | 0.44 | (R) | 90.9 |
| Example 3 | 1.56 | 1.18 | (R) | 90.4 |
| Example 4 | 0.86 | 0.69 | (R) | 96.4 |
| Example 5 | 1.59 | 1.31 | (R) | 89.7 |
| Example 6 | 1.21 | 0.84 | (R) | 90.6 |
| Example 7 | 1.52 | 0.89 | B (R) | 86.1 |
| Example 8 | 0.91 | 0.64 | B (R) | 93.4 |
| Example 9 | 1.54 | 0.99 | (R) | 89.1 |
| Example 10 | 0.87 | 0.30 | B (R) | 95.1 |
| Example 11 | 1.09 | 0.75 | B (R) | 92.4 |
| Example 12 | 0.65 | 0.60 | B (R) | 97.4 |
| Example 13 | 1.77 | 0.87 | (R) | 86.5 |

TABLE (II-1)-continued

| | ΔE | Hue Change Value | Hue Change | Strength (%) |
|---|---|---|---|---|
| Example 14 | 1.07 | 0.26 | (R) | 89.8 |
| Example 15 | 1.74 | 1.28 | (R) | 88.5 |
| Example 16 | 1.01 | 0.17 | (R) | 91.7 |
| Example 17 | 1.59 | 1.29 | (R) | 87.8 |
| Example 18 | 1.06 | 0.18 | (R) | 89.7 |
| Example 19 | 2.68 | 1.96 | (R) | 88.3 |
| Example 20 | 1.13 | 0.89 | (R) | 94.9 |
| Example 21 | 1.72 | 1.46 | (R) | 90.1 |
| Example 22 | 1.23 | 0.56 | (R) | 94.9 |
| Example 23 | 2.31 | 1.58 | (R) | 85.7 |
| Example 24 | 1.08 | 0.04 | (R) | 87.5 |

TABLE (II-2)

| | ΔE | Hue Change Value | Hue Change | Strength (%) |
|---|---|---|---|---|
| Comparative Example 1 | 2.02 | 1.46 | R (Y) | 85.2 |
| Comparative Example 2 | 2.36 | 1.26 | R (Y) | 80.9 |
| Comparative Example 3 | 2.70 | 0.83 | R (Y) | 80.6 |
| Comparative Example 4 | 2.17 | 1.72 | R (Y) | 86.8 |
| Comparative Example 5 | 2.42 | 1.60 | R (Y) | 82.5 |
| Comparative Example 6 | 2.61 | 0.50 | R (Y) | 80.7 |
| Comparative Example 7 | 1.93 | 1.45 | R (Y) | 86.0 |
| Comparative Example 8 | 2.07 | 1.37 | R (Y) | 83.7 |
| Comparative Example 9 | 2.43 | 0.22 | R (Y) | 82.5 |
| Comparative Example 10 | 2.76 | 2.24 | (R) | 87.9 |
| Comparative Example 11 | 2.92 | 1.75 | R (Y) | 82.4 |
| Comparative Example 12 | 2.56 | 0.53 | R (Y) | 79.8 |

The black dye composition of present invention can be widely applied to dyeing a greater range of spinning and weaving products that contain hydroxyl group or amide group. The composition of the present invention can be used in traditional dyeing methods, for example, exhausting, printing, or continuous dyeing.

For cellulose fiber, the black dye composition of the present invention is a dye composition of great industrial value. Dyed material with various good dyeing properties can be obtained, especially performing excellently in the properties of build-up, fastness of oxidative bleach, wash fastness, wash-off, and levelness.

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:

1. A black dye composition comprising:

(a) a black reactive dye of the formula (I):

(I)
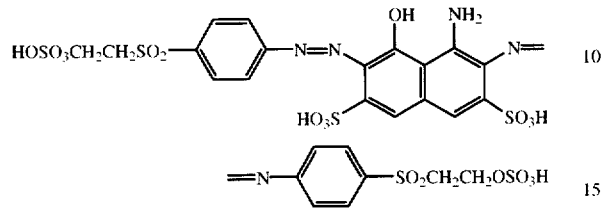

(b) at least a black or blue reactive dye with a good fastness of oxidative bleach and wash fastness, said black or blue reactive dye is selected from the group consisting of formula (III)

(III)
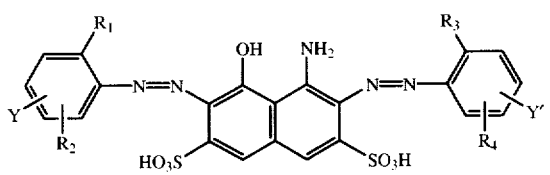

wherein Y and Y' each independent is —SO$_2$X, X is —CH=CH$_2$, —C$_2$H$_4$OSO$_3$H or —C$_2$H$_4$Cl, R$_1$, R$_2$, R$_3$ and R$_4$ each independent is hydrogen, halogen, C$_1$–C$_4$ alkyl C$_1$–C$_4$ alkoxyl, or sulfonyl groups and at least one of R$_1$, R$_2$, R$_3$ and R$_4$ in formula III is other than hydrogen, or formula (IV)

(IV)
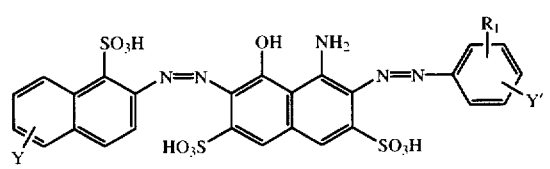

wherein Y, Y' and R$_1$ are defined as the above; and (c) at least a red, orange, yellow or other shade of reactive azo dye, said red, orange, yellow or other shade of reactive azo dye is selected from the group consisting of formula (V) formula (VI), formula (VII), formula (VIII), formula (IX), (V)
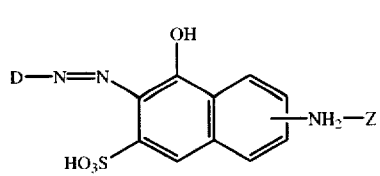

wherein D is

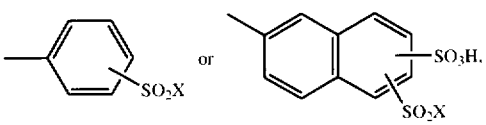

Z is 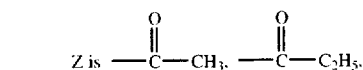

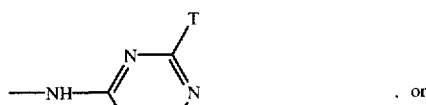, or

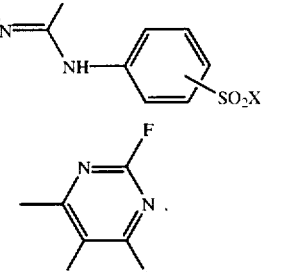

X and T are defined as the above, (VI)
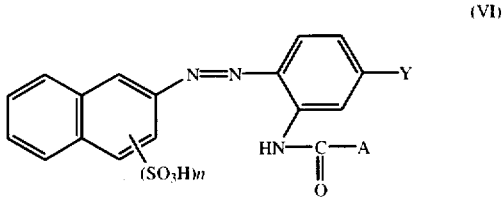

wherein Y is defined as the above, n is 1, 2, or 3, A is —OH, —NH$_2$, or —CH$_3$, (VII)
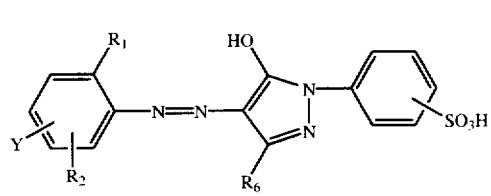

wherein Y, R$_1$, and R$_2$ are defined as the above, R$_6$ is —CO$_2$H, —NH$_2$, or —CH$_3$, (VIII)
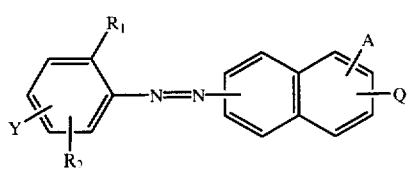

wherein Y, R$_1$, R$_2$ and A are defined as the above, Q is —CO$_2$H, or —SO$_3$H,

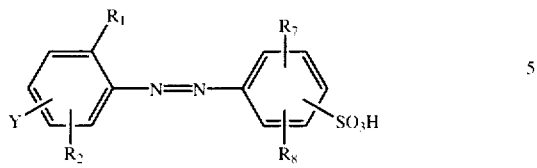

(IX)

wherein Y, $R_1$, and $R_2$ are defined as the above, $R_7$ and $R_8$ each independent is hydrogen, $C_1$–$C_4$ alkyl, amino or amino derivatives, wherein the composition exhibits improved fastness to oxidative bleaching than the same composition without the dye of formula III or IV.

2. The composition of claim 1, wherein said black or blue reactive dye of component (b) is selected from the formula (III).

3. The composition of claim 1, wherein said black or deep blue reactive dye of component (b) is selected from the formula (IV).

4. The composition of claim 2, wherein said formula (III) is the following formula (III-1)

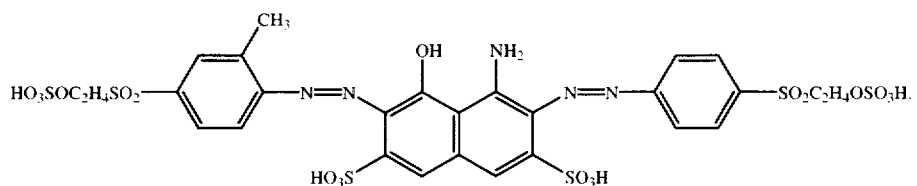

(III-1)

5. The composition of claim 2, wherein said formula (III) is the following formula (III-2)

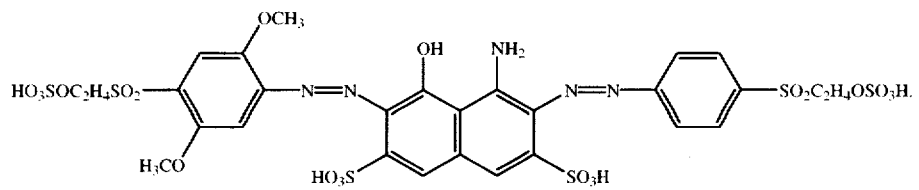

(III-2)

6. The composition of claim 1, wherein component (b) is the following formula (III-1),

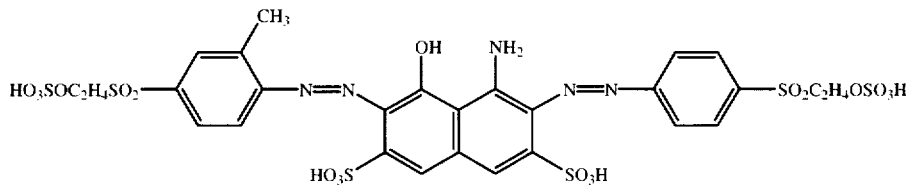

(III-1)

and component (c) is the following formula (V-3)

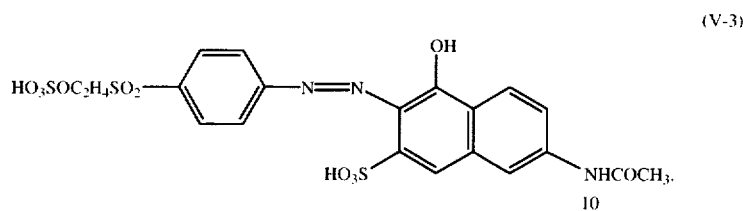

7. The composition of claim 1, wherein component (b) is the following formula (III-1),

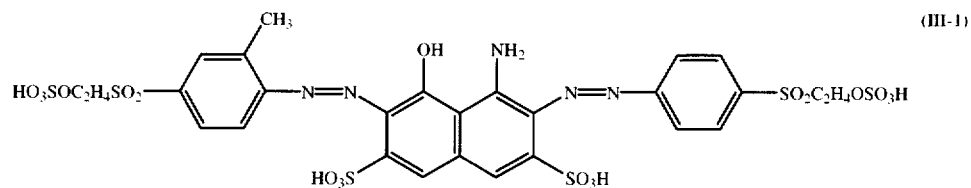

and component (c) is the following formula (VIII-2)

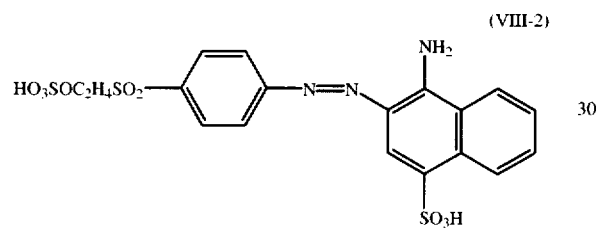

and formula (IX-2)

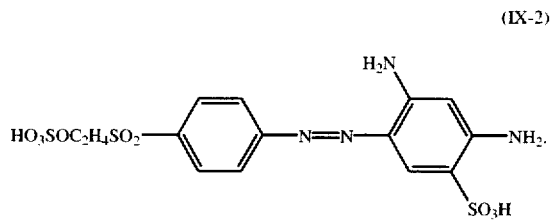

8. The composition of claim 1, wherein component (b) is the following formula (III-2), and component (c) is the following formula (V-3)

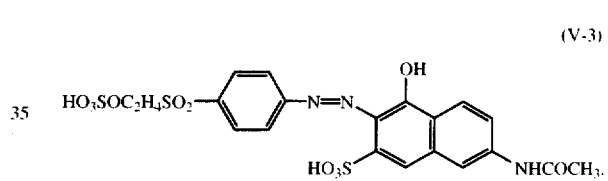

9. The composition of claim 1, wherein component (b) is the following formula (III-2),

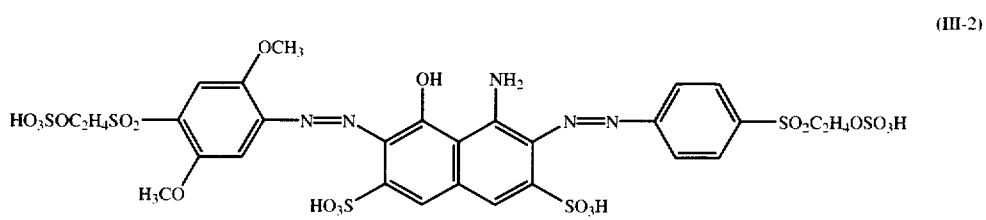

(III-2)

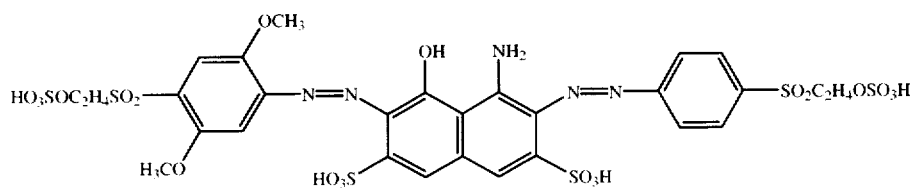

and component (c) is formula (VIII-2)

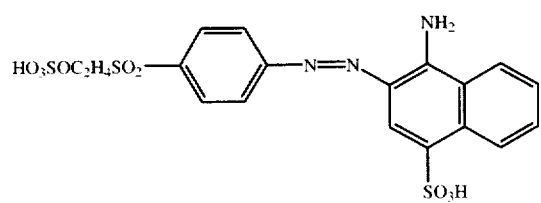

and formula (IX-2)

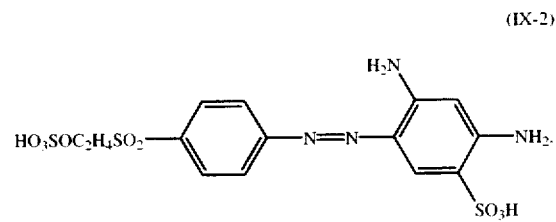

10. The composition of claim 6 comprising formula (I) 20% to 90% by weight, formula (III-1) 5% to 80% by weight, and formula (V-3) 3% to 30% by weight.

11. The composition of claim 7 comprising formula (I) 20% to 90% by weight, formula (III-1) 4% to 80% by weight, formula (VIII-2) 3% to 30% by weight, and formula (IX-2) 3% to 30% by weight.

12. The composition of claim 8 comprising formula (I) 20% to 90% by weight, formula (III-2) 5% to 80% by weight, and formula (V-3) 3% to 30% by weight.

13. The composition of claim 9 comprising formula (I) 20% to 90% by weight, formula (III-3) 4% to 80% by weight, formula (VIII-2) 3% to 30% by weight, and formula (IX-2) 3% to 30% by weight.

* * * * *

UNITED STATES PATENT AND TRADEMARK OFFICE
CERTIFICATE OF CORRECTION

PATENT NO. : 6,126,700  
DATED : October 3, 2000  
INVENTOR(S) : Bao-Kun et al.

Page 1 of 1

It is certified that error appears in the above-identified patent and that said Letters Patent is hereby corrected as shown below:

Column 3,
Line 40, please delete "$SO_2$" and insert -- $SO_2X$ --.

Column 30,
Line 27, please delete "X and T are defined as the above" and insert -- X is defined as the above, T is -F or -Cl --.

Signed and Sealed this

Sixteenth Day of October, 2001

Attest:

NICHOLAS P. GODICI
*Attesting Officer*     *Acting Director of the United States Patent and Trademark Office*